US005356503A

United States Patent [19]

Caryford et al.

[11] Patent Number: 5,356,503

[45] Date of Patent: Oct. 18, 1994

[54] MASKING ASSEMBLY AND MASKING METHOD FOR PROTECTING SURFACES FROM RADIANT HEAT

[75] Inventors: James D. Caryford, Afton Township, Washington County, Minn.; Robert J. Petrush, Sagamore Hills Township, Summit County, Ohio

[73] Assignee: Minnesota Mining and Manufacturing Company, St. Paul, Minn.

[21] Appl. No.: 60,705

[22] Filed: May 12, 1993

Related U.S. Application Data

[63] Continuation of Ser. No. 816,323, Dec. 30, 1991, abandoned.

[51] Int. Cl.[5] .................. B32B 31/00

[52] U.S. Cl. .................. 156/272.2; 156/275.3; 156/275.5; 156/527; 156/554; 427/208; 428/41; 428/354

[58] Field of Search .................. 427/208, 288; 118/504, 118/505; 156/554, 574, 523, 579, 527, 272.2, 166, 255, 275.3; 428/41, 42, 354

[56] References Cited

U.S. PATENT DOCUMENTS

| | | | |
|---|---|---|---|
| Re. 19,128 | 4/1934 | Drew | 427/208 |
| 2,919,218 | 12/1959 | May | 118/504 |
| 3,130,078 | 4/1964 | Lewis et al. | 118/505 |
| 3,787,271 | 1/1974 | Wahlquist | 156/279 |
| 4,033,803 | 7/1977 | Coder | 427/208 |
| 4,343,533 | 8/1982 | Currin et al. | 350/288 |
| 4,450,201 | 5/1984 | Brill et al. | 428/336 |
| 4,588,469 | 5/1986 | Hunter | 156/279 |
| 4,667,891 | 5/1987 | Pool | 242/75.4 |
| 4,704,315 | 11/1987 | McClintock | 427/208 |
| 4,913,767 | 4/1990 | Longworth | 156/527 |
| 4,915,769 | 4/1990 | Heil et al. | 156/527 |
| 4,981,537 | 1/1991 | Heil et al. | 156/279 |
| 4,989,769 | 2/1991 | Longworth et al. | 156/527 |
| 4,990,214 | 2/1991 | Heil et al. | 156/527 |
| 5,037,501 | 8/1991 | Lawson | 156/279 |

FOREIGN PATENT DOCUMENTS

| | | | |
|---|---|---|---|
| 0315410 | 2/1987 | European Pat. Off. | 118/504 |
| 2454394 | 11/1980 | France . | |
| 5242085 | 11/1973 | Japan | 118/504 |

OTHER PUBLICATIONS

U.S. Patent Application 07/642,712 filed Jan. 17, 1991, "Sheet Material For Masking Apparatus" for which the issue fee was paid on Feb. 27, 1992.

Patent Abtracts of Japan, vol. 13, No. 335 (M-856)Jul. 27, 1989 & JP-A-11 14 434 (GoGo Denichiro) May 8, 1989)-Abstract.

Database WPIL, Section Ch, Week 8220, Derwent Publications Ltd., London, GB; Class A09, AN 82-40359E & JP-A-57 059 748 (Nitto Electric Ind KK) Apr. 10, 1982-Abstract.

European Search Report EP92 31 1231.

*Primary Examiner*—Patrick J. Ryan

*Assistant Examiner*—Merrick Dixon

*Attorney, Agent, or Firm*—Gary L. Griswold; Walter N. Kirn; William L. Huebsch

[57] ABSTRACT

A method for protecting a surface from radiant heat such as for protecting an outer surface portion of an automobile from heat during radiant heating to cure paint on another newly painted outer surface portion of the automobile. Exposed adhesive on tape along one edge of masking material comprising a polyester backing layer with a reflective aluminum coating on one surface is adhered to a surface with the masking material extending between the source of radiant heat and the portion of the surface to be protected from the radiant heat.

6 Claims, 4 Drawing Sheets

MASKING ASSEMBLY AND MASKING METHOD FOR PROTECTING SURFACES FROM RADIANT HEAT

This is a continuation of application Ser. No. 07/816,323 filed Dec. 30, 1991, now abandoned.

TECHNICAL FIELD

The present invention relates to methods for protecting surfaces from radiant heat, and in one important aspect to methods for protecting outer surface portions of automobiles from heat during radiant heating to cure paint on other newly painted outer surface portions of the automobiles.

BACKGROUND ART

At least one major automobile manufacturer inspects the paint quality on automobiles moving along an assembly line after the wheels and tires are attached and after body parts made of polymeric materials such as body side moldings, bumpers, grilles and light housings have been assembled onto the automobiles. If a paint defect is found on an automobile, that automobile is diverted onto a auxiliary portion of the assembly line where the paint defect is repaired. That repair is affected by covering the automobile with a polymeric sheet in the form of a large bag, cutting away the portion of the bag over the portion of the automobile on which the paint surface to be repaired, using masking tape to attach the bag to the automobile around the periphery of that surface portion to be repaired so that the rest of the automobile will be protected from paint overspray, preparing and repainting the exposed surface portion, and then directing radiant heaters at the automobile to cure the paint on the newly painted surface. If this repair process is performed without appropriate protection, the radiant heat used to cure the paint can fuse the polymeric sheet to the body parts made of polymeric materials, and can soften and deform certain of those body parts. Thus, to provide needed protection, an aluminum foil and masking tape composite material is formed on a non portable apron taper. In that composite material the masking tape has a portion adhered along one edge portion of the aluminum foil and a portion projecting from that edge portion of the aluminum foil by which the composite material can be adhered to a substrate. The exposed portion of the coating of pressure sensitive adhesive on the tape and aluminum foil composite is adhered to a surface of the automobile before the polymeric bag is put in place with the aluminum foil extending over the portions of the outer surface of the automobile to be protected from the radiant heat used to cure the paint. While the aluminum foil is effective in providing protection from such radiant heating for the parts on the automobile over which it is positioned, the aluminum foil and masking tape composite is difficult to handle and apply due to the need to transport long lengths of the composite from a fixed location and the tendency for the aluminum foil to tear prior to application.

DISCLOSURE OF INVENTION

The present invention provides a method for protecting a surface from radiant heat, which method is useful for several purposes particularly including protecting portions of an automobile from heat during radiant heating used to cure paint on another newly painted outer surface portion of the automobile. When used for that purpose, the method is as effective, and more easily provided than the known method for providing such protection described above.

The method according to the present invention for protecting surfaces from radiant heat generally comprises the steps of (1) providing a roll of masking material which comprises a layer of flexible nonmetallic backing material having a coating of metal on one surface that provides a reflectance of at least 50 percent of the radiant heat for the sheet of masking material; (2) providing a easily portable dispensing device (e.g., that portable dispensing device described in U.S. Pat. No. 4,667,891 incorporating the improvements described in U.S. Pat. Nos. 4,913,767, 4,915,769, 4,989,769 and 4,990,214) comprising a frame having a handle adapted for manual manipulation of the dispensing device and first and second spindles mounted on the frame for rotation about axes that are parallel and spaced; (3) mounting the tape roll coaxially about the first spindle with the first edge of the length of tape at a first predetermined position axially with respect to the first and second spindles; (4) mounting the roll of masking material coaxially about the second spindle with the first edge of the sheet at a second predetermined position axially with respect to the first and second spindles, and with the width of the length of tape extending from the first position past the second position and the width of the masking material extending from the second position past the first position so that a portion of the length of tape along the first edge of the length of tape and a portion of the sheet along the first edge of the sheet are both positioned between the first and second positions; (5) pulling the tape and masking material from the dispensing device along paths relative to the frame including a path for the length of tape from the tape roll and a path for the sheet from the roll of masking material, the paths including a common path portion so that the pressure sensitive adhesive along the first edge of the length of tape adheres to the portion of the sheet along the first edge of the sheet to form a tape and masking material composite having opposite edges defined by the second edges of the length of tape and the masking material and an exposed portion of the coating of pressure sensitive adhesive along the second edge of the length of tape; and (6) adhering the exposed portion of the coating of pressure sensitive adhesive on the tape and masking material composite to a surface with the masking material extending between the surface to be protected and the source of radiant heat.

The method according to the present invention is particularly useful for protecting portions of the outer surface of an automobile from heat during radiant heating of a newly painted outer surface portion of the automobile. When used for that purpose, the method includes placing the masking material over the portion of the outer surface of the automobile to protect that portion of the outer surface of the automobile from radiant heat used to cure paint on another newly painted outer surface portion of the automobile, and the method provides the significant advantages over the known method of protection using aluminum foil described above that the tape and masking material composite is made by a portable device and thus can be made closely adjacent or along the portion of the surface to which it is to be adhered, and the tape and masking material composite is much lighter, stronger and more easily handled than composite material made with tape and aluminum foil, while being at least as effective as composite material made with tape and aluminum foil.

When used to protect an outer surface portion of an automobile, the method according to the present invention can further include the step of covering with a polymeric sheet the portion of the outer surface of the automobile to be protected from radiant heat during radiant heating of a newly painted outer surface portion of the automobile, in which case the exposed portion of the coating of pressure sensitive adhesive on the tape and masking material composite either (1) can be adhered to a surface of the automobile before the automobile is covered with the polymeric sheet so that the masking material extends over the portion of the outer surface of the automobile to be protected beneath the polymeric sheet; or (2) can be adhered to a surface of the polymeric sheet opposite the automobile after the automobile is covered with the polymeric sheet so that the masking material extends over the portion of the outer surface of the automobile and over the polymeric sheet which provides the added advantage that the masking material is removed with the bag after the painting operation.

There are many other uses for the method according to the present invention for protecting a surface from radiant heat, including applying the tape and masking material composite as a temporary window shade which can, for example, prevent improper curing of new varnish on a wooden floor that can result from the radiant heat in sunlight shining through a window onto the floor, while still passing sufficient sun light (e.g., ten percent visible light transmission) to illuminate the room for the workmen applying the varnish.

The flexible non metallic backing material in the masking material could be made of many materials, including polymeric materials such as polypropylene, polyethylene, or acrylic, or non polymeric materials such as paper or cloth. Preferably, however, the backing material is general purpose polyester that could be from 0.00025 inch to over 0.003 inch thick and preferably is in the range of 0.0005 to 0.001 inch thick. Polyester is preferred because of its flexibility and its resistance to tearing, stretching or fracture both at room temperature and at the elevated temperatures at which metal can be applied to its surface by the metal evaporating process.

The metal coating in the masking material is preferably aluminum applied to the backing material by a vacuum deposition process (e.g. the metal evaporating process), however, other metals capable of reflecting radiant heat could also be used, such as nickel, silver or metal alloys such as "Nichrome" (T.M.). The metal in the coating should be applied in a thickness that is very much thinner than the backing material while providing a reflectance of the radiant heat it is intended to protect against of at least 50 percent and preferably at least about 70 percent. Also, preferably the sheet of masking material in the roll is disposed with the metal coating on the outer surface of the backing material with respect to the radius of the roll. This results in the metal layer being on the outer surface of the backing material when the tape and masking material composite is adhered over a surface to be protected, and thereby results in greater reflectance of radiant heat for a given metal coating thickness (particularly reflectance of heat in the infrared range) than when the metal coating is on the inner surface of the backing material on the roll.

BRIEF DESCRIPTION OF DRAWING

The present invention will be further described with reference to the accompanying drawing wherein like reference numerals refer to like parts in the several views, and wherein.

DETAILED DESCRIPTION

Figure 1:
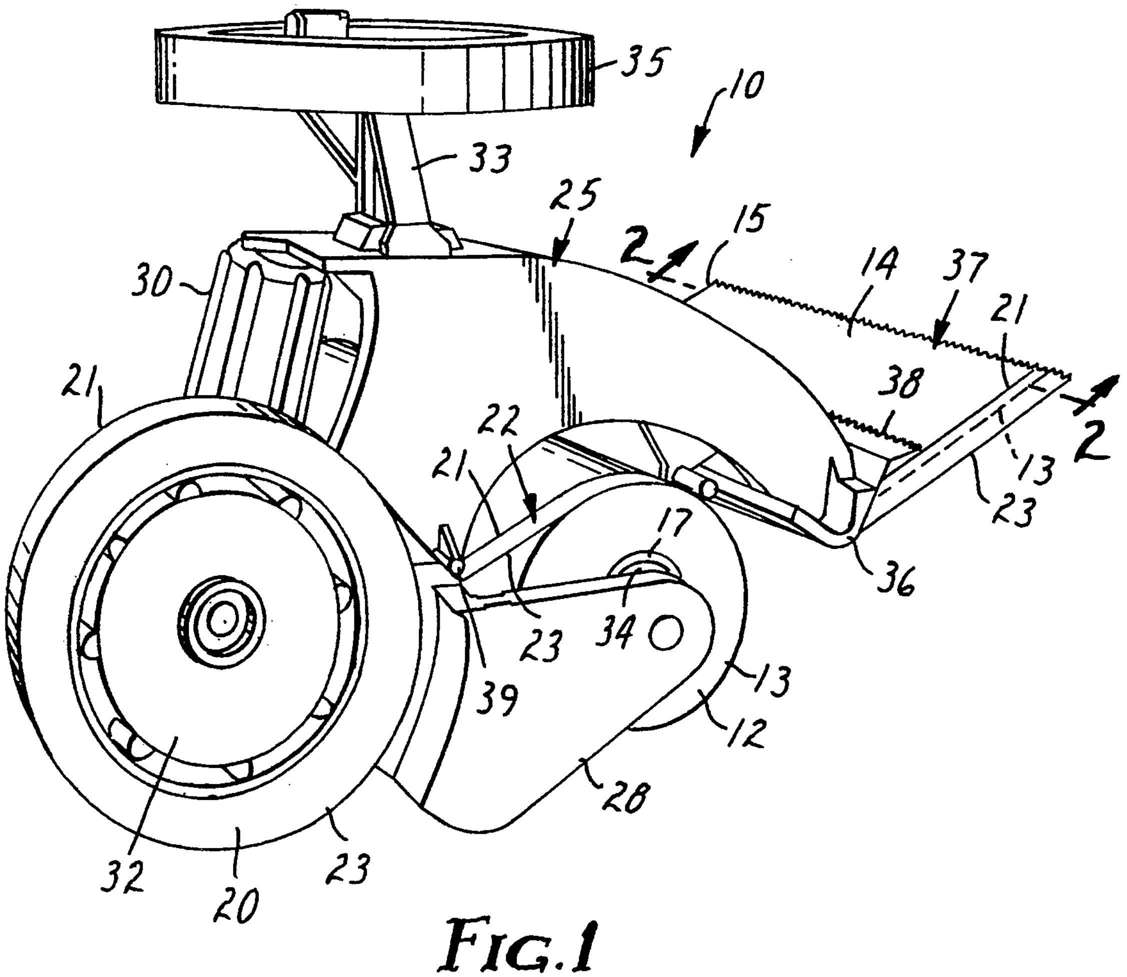
FIG. 1 is a perspective view of a portable assembly according to the present invention.

Referring now to the drawing, there is shown a portable assembly according to the present invention, generally designated by the reference numeral 10, which portable assembly 10 is adapted for forming a composite useful for protecting a surface from a source of radiant heat, for example to protect an outer surface portion of an automobile during radiant heating to cure paint on another newly painted outer surface portion of the automobile.

Figure 2:
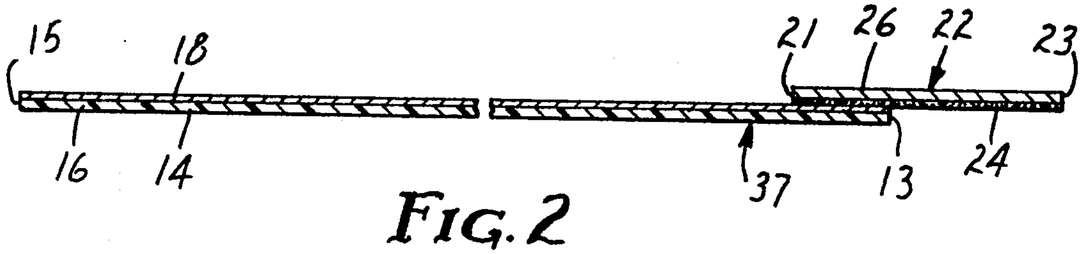
FIG. 2 is an enlarged fragmentary view taken approximately along lines 2—2 of FIG. 1 showing the structure of a tape and masking material composite made on the portable assembly of FIG. 1.

Generally the portable assembly 10 comprises a roll 12 of masking material, which roll 12 has an axis and comprises an elongate thin flexible sheet 14 of masking material having opposite first and second untaped elongate edges 13 and 15, which sheet 14 of masking material is coiled around a cylindrically tubular core 17. The roll 12 of masking material has first and second axially spaced ends defined by the first and second elongate edges 13 and 15 of the sheet 14 of masking material. The sheet 14 of masking material (see FIG. 2) comprises a layer 16 of flexible backing material (e.g., polyester) having opposite major surfaces and a coating 18 of metal (e.g., aluminum) on the surface of the layer 16 of flexible backing material that is disposed radially outermost in the roll 12. That coating 18 of metal provides a reflectance for radiant heat of at least 50 percent and preferably above 70 percent for the sheet 14 of masking material. Preferably the sheet 14 of masking material is made by coating one side of general purpose polyester film in the range of 0.0005 to 0,001 inch thick with 99.99 percent pure aluminum using a conventional vacuum deposition (e.g., metal evaporation) technique. The aluminum is coated in an amount that, 48 hours after the coating process, will provide a reflectance for visible radiation of about 70 percent (e.g., 70 percent reflectance within a wide tolerance such as plus or minus 10 percent) for such radiation directed against the exposed surface of the coating 18 of aluminum, which coating 18 of aluminum also provides a reflectance of at least 70 percent (i.e., normally over 80 percent) for radiant heat in the infrared range. Such reflectance for radiant heat in the infrared range is believed to be the most important aspect when the sheet 14 of masking material is used to protect against the heat radiating from radiant heat panels of the type used to dry paint on auto bodies in some automobile manufacturing lines.

The portable assembly 10 also includes a tape roll 20 comprising a coiled length of tape 22 having first and second elongate edges 21 and 23 and comprising a coating 24 of pressure sensitive adhesive on one surface of a backing 26. For many purposes when the tape 22 is to be exposed to radiant heat and then needs to be cleanly removed from a substrate the tape 22 should be that tape adapted for high temperature use that is commercially available from Minnesota Mining and Manufacturing Company, St. Paul, Minn. under the trade designation No 2317 masking tape; which tape can be exposed to radiant heat for the time typically needed to cure the paint and will thereafter cleanly release from a substrate to which it is adhered. Other masking tapes, however, could be suitable where the tape is not exposed to high temperatures or where clean removal of the tape is not a requirement (e.g., where the tape is adhered to the outer surface of a polymeric sheet that is later disposed of).

The portable assembly 10 further includes an easily portable dispensing device 25 comprising a frame 28 including a handle 30 adapted for manual engagement, first and second spindles 32 and 34 having axes, and means mounting the spindles 32 and 34 on the frame 28 for rotation about their axes with their axes spaced and generally parallel. The tape roll 20 is mounted coaxially about the first spindle 32 with the first edge 21 of the length of tape 22 at a first predetermined position axially with respect to the first and second spindles 32 and 34, and the roll 12 of masking material is mounted coaxially about the second spindle 34 with the first edge 13 of the sheet of masking material 14 at a second predetermined position axially with respect to the first and second spindles 32 and 34, and with the width of the tape 22 extending from the first position past the second position and the width of the sheet of masking material 14 extending from the second position past the first position so that a portion of the length of tape 22 along its first edge 21 and a portion of the sheet of masking material 14 along its first edge 37 are both positioned between the first and second positions. Path defining means on the frame 28 and including means provided by or adjacent the spindles 32 and 34 locate the first edges 21 and 13 of the tape 22 and the sheet 14 of masking material respectively at the first and second positions axially with respect to the spindles 32 and 34 and define a path for the length of tape 22 from the tape roll 20 to the periphery of the roll 12 of masking material, a path for the sheet 14 of masking material from the roll 12 of masking material, and a common path portion beginning on the periphery of the roll 12 of masking material where, in response to the tape 22 and the sheet of masking material 14 being pulled from the dispensing device 25 around a guide shoe 36, the pressure sensitive adhesives 24 along the first edge 21 of the length of tape 22 adheres to the portion of the sheet 14 of masking material 14 along its first edge 13 to form a tape and masking material composite 37 having opposite edges defined by the second edges 23 and 15 of the length 22 of tape and the sheet 14 of masking material and an exposed portion of the coating 24 of pressure sensitive adhesive along the second edge 23 of the length 22 of tape. After a desired length of the tape and masking material composite 37 is formed by the dispensing device 25 and manually cut off by a cutting blade 38 on the dispensing device 25, that exposed portion of the coating 24 of pressure sensitive adhesive is adapted to be adhered to a surface with the sheet 14 of masking material 14 extending over a portion of the outer surface of the automobile to protect that portion from radiant heat used to cure paint on another outer portion of the automobile.

Preferably, as illustrated, the dispensing device 25 is generally the type of device described in U.S. Pat. No. 4,667,891 in which the cut off blade 38 is the type of blade adapted for cutting polymeric material that is described in U.S. Pat. No. 4,913,767 and is protected by a blade guard (not shown) of the type described in U.S. Patent No. 4,989,769; there is provided a detachable support assembly 33 for an auxiliary roll of tape 35 of the type described in U.S. Pat. No. 4,915,769; and there is included a tracking member 39 of the type described in U.S. Pat. No. 4,990,214; the contents of which U.S. Pat. Nos. 4,466,789, 4,913,767, 4,989,769, 4,915,769, and 4,990,214 are incorporated herein by reference.

Figure 3:
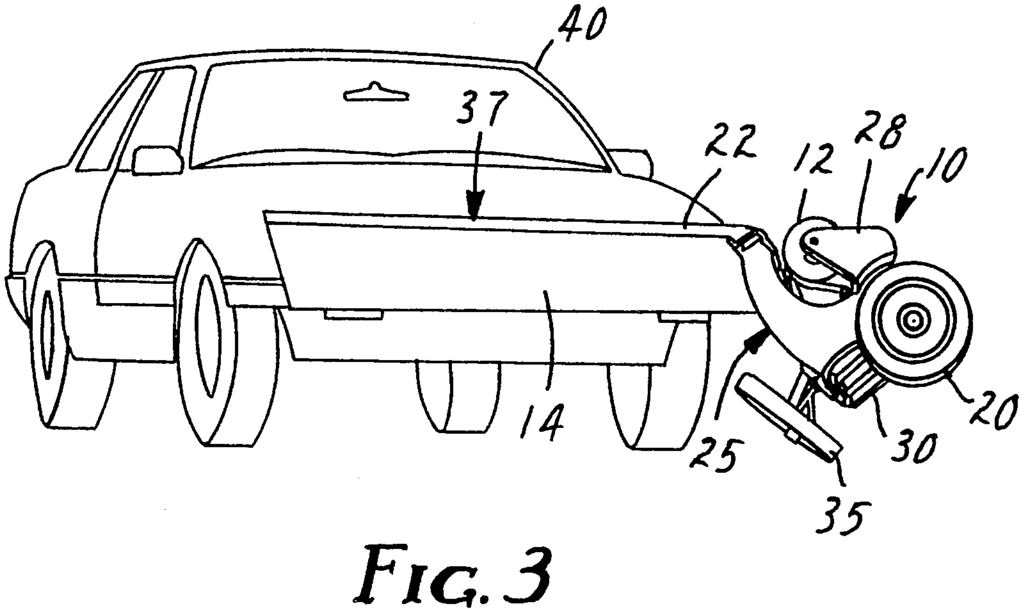
FIG. 3 is a perspective view illustrating the portable assembly of FIG. 1 being used to apply the tape and masking material composite to the surface of an automobile.
Figure 4:
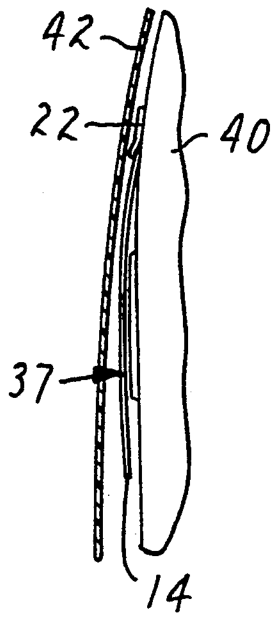
FIGS. 4 is an enlarged fragmentary view illustrating a polymeric sheet applied over the tape and masking material composite applied to the surface of the automobile as illustrated in FIG. 3.
Figure 5:
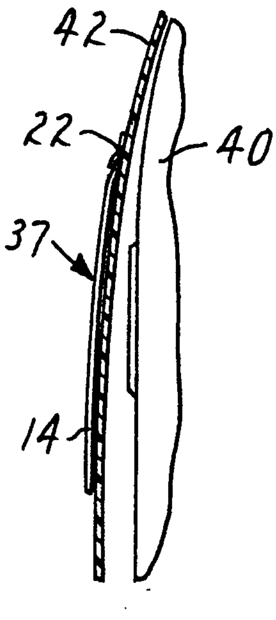
FIGS. 5 is an enlarged fragmentary view illustrating the tape and masking material composite applied to the outer surface of a polymeric sheet disposed over an automobile.

FIGS. 3, 4 and 5 illustrate use of the method according to the present invention for protecting outer surface portions of an automobile 40 from heat during radiant heating to cure paint on another newly painted outer surface portion of the automobile 40 which comprises the steps of providing the roll 12 of masking material, the roll 20 of tape and the portable dispensing device 25 described above and mounting the rolls 12 and 20 on the spindles 32 and 34 of the device 25 in the manner indicated above. The tape 22 and the masking material 14 are then pulled from the dispensing device 25 to form the tape and masking material composite 37 having an exposed portion of the coating 24 of pressure sensitive adhesive along the second edge 23 of the length of tape 22. The exposed portion of the coating 24 of pressure sensitive adhesive on the tape and masking material composite 37 is then adhered to a surface with the masking material 12 extending over the portion of the outer surface of the automobile 40 to protect that portion of the outer surface of the automobile 40 from radiant heat used to cure paint on another newly painted outer surface portion of the automobile 40.

Prior to painting and directing radiant heaters at the automobile 40 to cure the paint on the newly painted surface, the method can further include the known steps illustrated in FIGS. 4 and 5 of covering the portions of the outer surface of the automobile 40 that are not to be painted with a polymeric sheet 42 to protect them from debris and paint overspray. That covering step can be performed by placing a large polymeric bag 42 over the automobile 40, cutting away the portion of the bag 42 over the portion of the automobile 40 on which the paint surface to be repaired, and using masking tape to attach the bag 42 to the automobile 40 around the periphery of that surface portion to be repaired so that the rest of the automobile 40 will be protected from debris and paint overspray as the exposed surface portion is prepared and repainted. The exposed portion of the coating 24 of pressure sensitive adhesive on the tape and masking material composite 37 either (1) can be adhered to a surface of the automobile 40 before the automobile is covered with the polymeric sheet or bag 42 as is illustrated in FIG. 3 so that the masking material 14 extends over the portion of the outer surface of the automobile 40 to be protected beneath the polymeric sheet or bag 42 as is illustrated in FIG. 4, or (2) can be adhered to a surface of the polymeric sheet 42 opposite the automobile 40 with the masking material 14 extending over the portion of the outer surface of the automobile 40 to be protected over the polymeric sheet 42 as is illustrated in FIG. 5. Adhering the tape and masking material composite 37 to the surface of the polymeric sheet 42 opposite the automobile. 40 as is illustrated in FIG. 5 provides the advantage that the tape and masking material composite 37 can be removed with the bag 42 after the paint is cured.

As illustrated in FIG. 1 and described above, the coiled sheet of masking material 14 is not folded so that first and second ends of the roll 12 of masking material are defined by the first and second elongate edges 13 and 15 of the sheet 14 of masking material. Optionally, when a wider width is desired, a sheet 44 of masking material can be folded and wound into a roll 45 of masking material as is illustrated in FIGS. 6 and 7 and as is further described in allowed U.S. patent application No. 07/642,712, the content of which is incorporated herein by reference, which roll 45 of masking material can be used in place of the roll 12 of masking material on the dispensing device 25 to form a portable assembly according to the present invention on which can be formed a tape and masking material composite from the tape 22 and the sheet 44 of masking material.

The sheet 44 of masking material (see FIG. 7) comprises a layer 46 of flexible backing material (e.g., polyester) having opposite major surfaces and a coating 48 of metal (e.g., aluminum) on the surface of the layer 46 of flexible backing material that is disposed radially outermost in the roll 45. Like the coating 18 of metal described above, that coating 48 of metal provides a reflectance for radiant heat of at least 50 percent and preferably above 70 percent for the sheet 44 of masking material.

Figure 6:
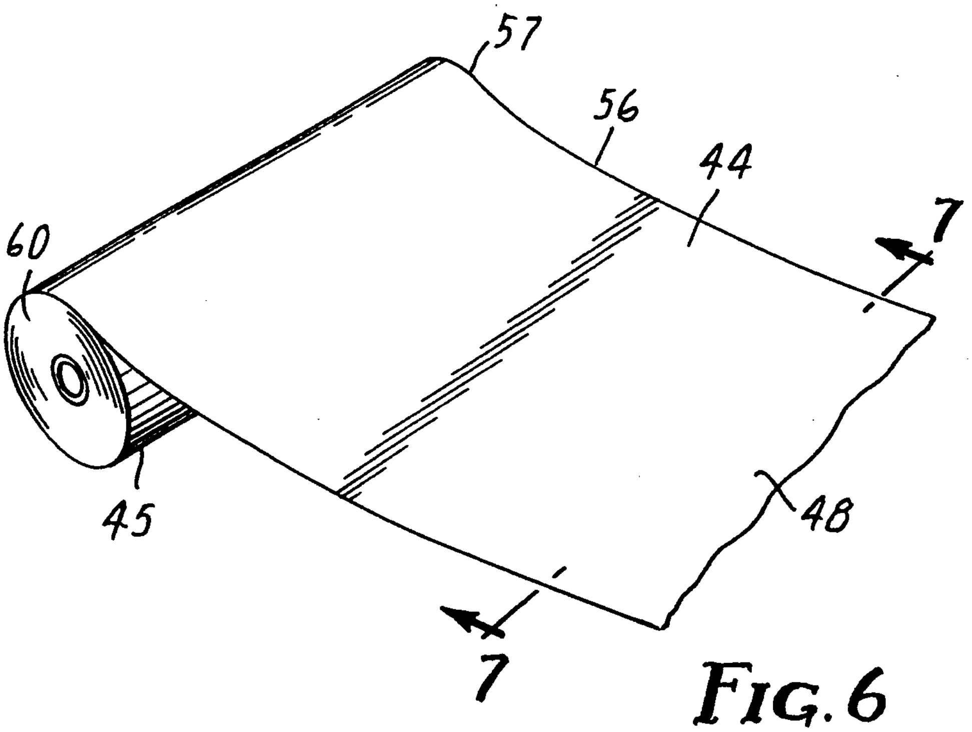
FIGS. 6 is a perspective view of an alternate embodiment of a roll of masking material for use in the portable assembly according to the present invention.
Figure 7:
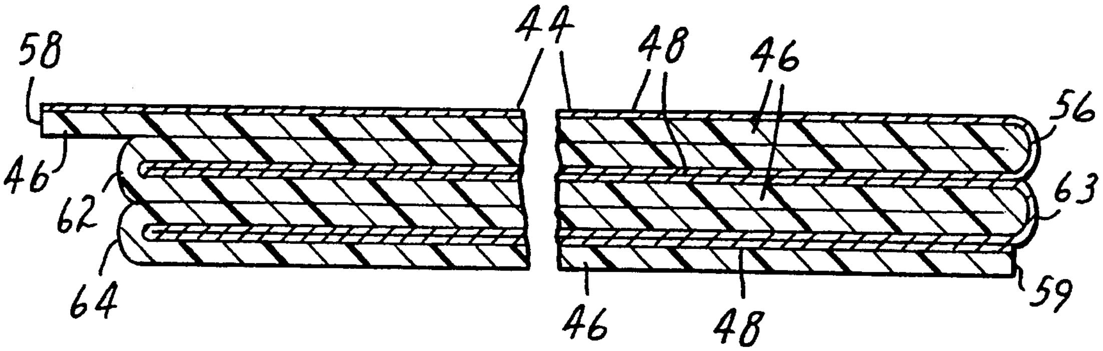
FIG. 7 is an enlarged fragmentary view taken approximately along line 7—7 of FIG. 6.

The sheet 44 of masking material illustrated in FIGS. 6 and 7 has a longitudinally extending first fold 56 at a second end 57 of the roll 45 of masking material and between the first and second edges 58 and 59 of the sheet 44 of masking material. The first fold 56 defines a second edge of a first pleat-like portion of the sheet 44 of masking material extending between the first fold 56 and the first edge 58 of the elongate sheet 44 of masking material. The first pleat-like portion has opposite inner and outer major surfaces with its outer major surface being defined by the coating 48 of metal and being disposed radially outwardly on the roll 45 of masking material with respect to the inner major surface. The first fold 56 defines a first edge of a second pleat-like portion of the sheet 44 of masking material extending from the first fold 56 toward a first end 60 of the roll 45 of masking material along the inner major surface of the first pleat-like portion and having a second longitudinally extending edge adjacent the first end 60 of the roll 45 of masking material defined by a second fold 62. The sheet 44 of masking material also includes two additional folds 63 and 64 which together with the folds 56 and 62 define a plurality of or four pleat like portions of the sheet 44 of masking material disposed radially inwardly of the roll 45 of masking material from the inner major surface of the first pleat-like portion and having longitudinally extending generally radially aligned edges adjacent the first end 60 of the roll 45 of masking material that are closely spaced (e.g., in the range of 0.003 to 0.312 inch from the first edge 58 of the sheet 44 of masking material to both restrict contact of the pressure sensitive adhesive 24 on the tape 22 with the adjacent folds defining the pleat-like portions when the tape 22 is adhered to the outer surface of the first pleat like portion, while providing support radially of the roll 45 of masking material for the first pleat-like portion of the sheet 44 closely adjacent the first edge 58 of the sheet 44 of masking material to assure firm engagement of the pressure sensitive adhesive 24 with the sheet 44 of masking material adjacent the first edge 58 as the tape 22 and sheet 44 of masking material are pulled from the dispensing device 25 to form the tape and masking material composite.

Figure 8:
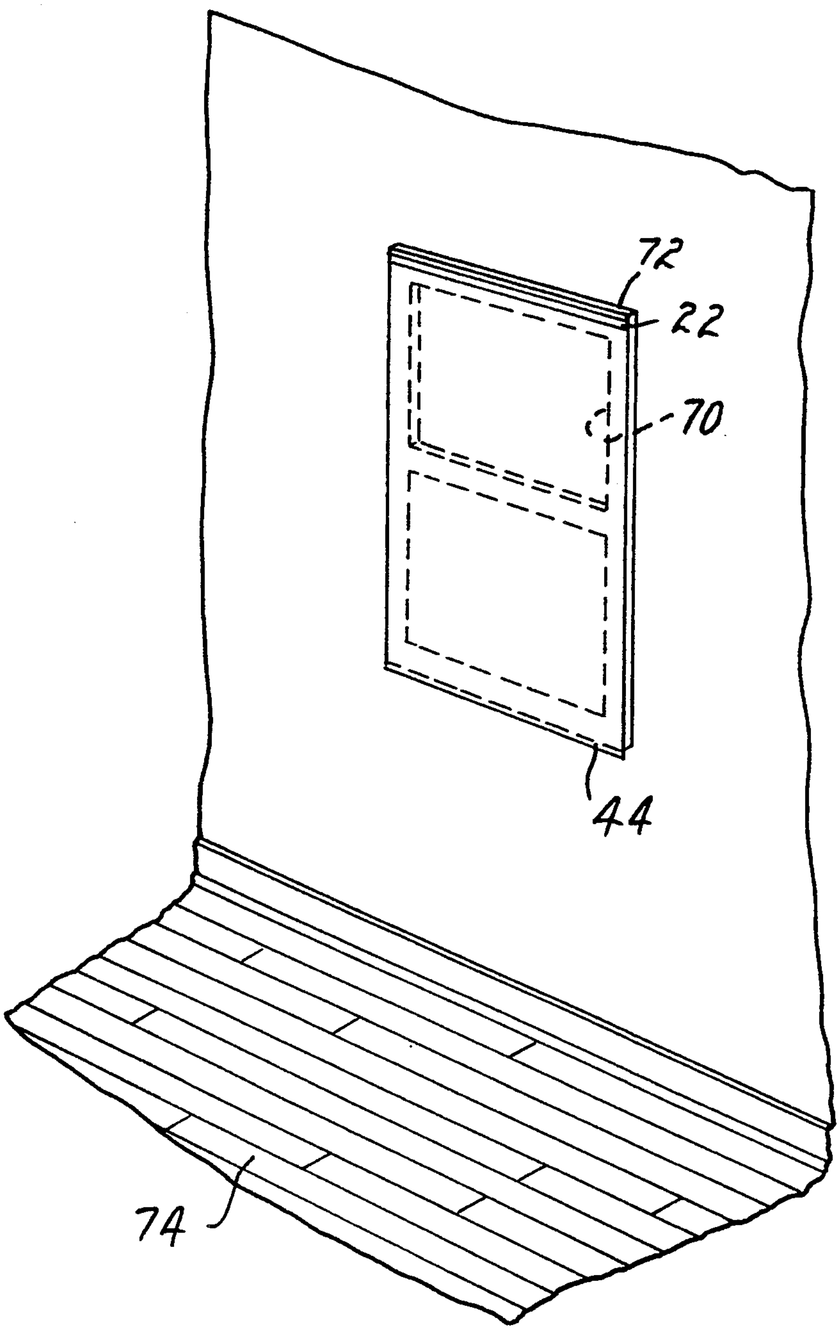
FIG. 8 is a fragmentary perspective view illustrating the use of the tape and masking material composite as a temporary window shade.

Using the roll 45 of masking material in place of the roll 12 of masking material on the dispensing device 25 to form a tape and masking material composite from the tape 22 and the sheet 44 of masking material can provide advantages when a wider sheet 44 of masking material is desired, such as to cover a larger portion of the outer surface of an automobile or for other purposes. One such other purpose is illustrated in FIG. 8 in which a tape and masking material composite from the tape 22 and the sheet 44 of masking material has been used to cover a window 70 by adhering exposed pressure sensitive adhesive on the tape 22 to an upper portion 72 of the frame for the window 70, thereby providing a temporary radiant heat reflective shade for the window 70 to restrict improper curing of a fresh coat of varnish on a wooden floor 74 that could result if the sheet 44 of masking material was not present, as a result of radiant heat in sunlight shining through the window 44 onto the floor 74. When used for this purpose, preferably the sheet 44 of masking material should have a visible light transmissivity of at least ten percent to provide light for workmen applying the varnish, and may optionally include an ultraviolet light absorber to further restrict solar ultraviolet radiation.

The present invention has now been described. It will be apparent to those skilled in the art that many changes or modifications can be made in the methods and embodiments described without departing from the scope of the present invention. Thus the scope of the present invention should not be limited to the structures and methods described in this application, but only by structures and methods described by the language of the claims and the equivalents of those structures and methods.

We claim:

1. A method for protecting portions of an assembly from radiant heat during radiant heating to cure paint on another newly painted outer surface portion of the assembly, said method comprising the steps of:

providing a roll of masking material having an axis, the roll of masking material comprising a coiled elongate thin flexible sheet of masking material having opposite first and second untaped elongate edges, and the roll of masking material having first and second axially spaced ends with the first end of the roll being defined by the first elongate edge of the sheet, the sheet of masking material comprising a layer of flexible backing material having opposite major surfaces and a coating of metal on one of the surfaces of the backing material providing a reflectance of at least 50 percent of radiant heat for the sheet of masking material;

providing a tape roll comprising a coiled length of tape having first and second elongate edges and comprising a coating of pressure sensitive adhesive;

providing a portable dispensing device comprising a frame having a handle adapted for manual manipulation of the dispensing device and first and second spindles each having an axis, said spindles each being mounted on the frame for rotation about the axis of the Spindle with the axis of the first spindle being spaced from and generally parallel to the axis of the second spindle;

mounting the tape roll coaxially about the first spindle with the first edge of the length of tape at a first predetermined position axially with respect to the first and second spindles;

mounting the roll of masking material coaxially about the second spindle with the first edge of the sheet at a second predetermined position axially with respect to the first and second spindles, and with the width of the length of tape extending from the first position past the second position and the width of the sheet of masking material extending from the second position past the first position so that a portion of the length of tape along the first edge of the length of tape and a portion of the sheet of masking material along the first edge of the sheet of masking material are both positioned between the first and second positions;

pulling the tape and sheet of masking material from the dispensing device along paths relative to the frame including a path for the length of tape from the tape roll and a path for the sheet of masking material from the roll of masking material, the paths including a common path portion so that the pressure sensitive adhesive along the first edge of the length of tape adheres to the portion of the sheet of masking material along the first edge of the sheet of masking material to form a tape and masking material composite having opposite edges defined by the second edges of the length of tape and the sheet of masking material and an exposed portion of the coating of pressure sensitive adhesive along the second edge of the length of tape;

adhering the exposed portion of the coating of pressure sensitive adhesive on the tape and masking material composite to a surface with the sheet of masking material extending over the portion of the assembly to protect that portion of the assembly from radiant heat used to cure paint on another newly painted outer surface portion of the assembly, said pulling step being done closely adjacent or along the surface to which the exposed portion of the coating of pressure sensitive adhesive on the tape and masking material composite is adhered during said adhering step;

painting the outer surface portion of the assembly;

directing radiant heat toward the assembly to cure the paint on the outer surface portion; and removing the tape and sheet of masking material.

2. A method for protecting according to claim 1 further including the step of covering with a polymeric sheet the portion of the outer surface of the assembly to be protected from radiant heat during said step of directing radiant heat, and wherein in said adhering step the exposed portion of the coating of pressure sensitive adhesive on the tape and masking material composite is adhered to a surface of the assembly with the masking material extending over the portion of the outer surface of the assembly beneath the polymeric sheet to protect that portion of the outer surface of the assembly from radiant heat.

3. A method for protecting according to claim 1 further including the step of covering with a polymeric sheet the portion of the outer surface of the assembly to be protected from radiant heat during said step of directing radiant heat, and wherein in said adhering step the exposed portion of the coating of pressure sensitive adhesive on the tape and masking material composite is adhered to a surface of the polymeric sheet opposite the assembly with the masking material extending over the portion of the outer surface of the assembly and over the polymeric sheet to protect that portion of the outer surface of the assembly from radiant heat.

4. A method for protecting outer surface portions of an automobile from radiant heat during radiant heating to cure paint on another newly painted outer surface portion of the automobile, said method comprising the steps of:

providing a roll of masking material having an axis, the roll of masking material comprising a coiled elongate thin flexible sheet of masking material having opposite first and second untaped elongate edges, and the roll of masking material having first and second axially spaced ends with the first end of the roll being defined by the first elongate edge of the sheet, the sheet of masking material comprising a layer of flexible backing material having opposite major surfaces and a coating of metal on one of the surfaces of the backing material providing a reflectance of at least 50 percent of radiant heat for the sheet of masking material;

providing a tape roil comprising a coiled length of tape having first and second elongate edges and comprising a coating of pressure sensitive adhesive;

providing a portable dispensing device comprising a frame having a handle adapted for manual manipulation of the dispensing device and first and second spindles each having an axis, said spindles each being mounted on the frame for rotation about the axis of the spindle with the axis of the first spindle being spaced from and generally parallel to the axis of the second spindle;

mounting the tape roil coaxially about the first spindle with the first edge of the length of tape at a first predetermined position axially with respect to the first and second spindles;

mounting the roil of masking material coaxially about second spindle with the first edge of the sheet at a second predetermined position axially with respect to the first and second spindles, and with the width of the length of tape extending from the first position past the second position and the width of the sheet of masking material extending from the second position past the first position so that a portion of the length of tape along the first edge of the length of tape and a portion of the sheet of masking material along the first edge of the sheet of masking material are both positioned between the first and second position;

pulling the tape and sheet of masking material from the dispensing device along paths relative to the frame including a path for the length of tape from the tape roll and a path for the sheet of masking material from the roll of masking material, the paths including a common path portion so that the pressure sensitive adhesive along the first edge of the length of tape adheres to the portion of the sheet of masking material along the first edge of the sheet of masking material to form a tape and masking material composite having opposite edges defined by the second edges of the length of tape and the sheet of masking material and an exposed portion of the coating of pressure sensitive adhesive along the second edge of the length of tape;

adhering the exposed portion of the coating of pressure sensitive adhesive on the tape and masking material composite to a surface with the sheet of masking material extending over the portion of the outer surface of the automobile to protect that portion of the outer surface of the automobile from radiant heat used to cure paint on another newly painted outer surface portion of the automobile, said pulling step being done closely adjacent or along the surface to which the exposed portion of the coating of pressure sensitive adhesive on the tape and masking material composite is adhered during said adhering step;

painting the outer surface portion of the automobile;

directing radiant heat toward the automobile to cure the paint on the outer surface portion; and removing the tape and sheet of masking material.

5. A method for protecting according to claim 1 further including the step of covering with a polymeric sheet the portion of the outer surface of the automobile to be protected from radiant heat during [said step of directing radiant heat, and wherein in said adhering step the exposed portion of the coating of pressure sensitive adhesive on the tape and masking material composite is adhered to a surface of the automobile with the masking material extending over the portion of the outer surface of the automobile beneath the polymeric sheet to protect that portion of the outer surface of the automobile from radiant heat.

6. A method for protecting according to claim 1 further including the step of covering with a polymeric sheet the portion of the outer surface of the automobile to be protected from radiant heat during said step of directing radiant heat, and wherein in said adhering step the exposed portion of the coating of pressure sensitive adhesive on the tape and masking material composite is adhered to a surface of the polymeric sheet opposite the automobile with the masking material extending over the portion of the outer surface of the automobile and over the polymeric sheet to protect that portion of the outer surface of the automobile from radiant heat.

* * * * *